US009117305B2

(12) United States Patent
McWethy et al.

(10) Patent No.: US 9,117,305 B2
(45) Date of Patent: Aug. 25, 2015

(54) METHOD AND APPARATUS FOR DERIVING STREAM NETWORK VECTORS FROM DIGITAL ELEVATION MAP DATA

(75) Inventors: Leslie G. McWethy, Renton, WA (US); Zhenkui Ma, Kent, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 232 days.

(21) Appl. No.: 13/537,934

(22) Filed: Jun. 29, 2012

(65) Prior Publication Data

US 2014/0003672 A1    Jan. 2, 2014

(51) Int. Cl.
G06K 9/00        (2006.01)
G06T 17/05       (2011.01)

(52) U.S. Cl.
CPC ..................................... *G06T 17/05* (2013.01)

(58) Field of Classification Search
None
See application file for complete search history.

(56) References Cited

U.S. PATENT DOCUMENTS

| 6,654,690 | B2 * | 11/2003 | Rahmes et al. | 702/5 |
| 2005/0049802 | A1 * | 3/2005 | Minton, Jr. | 702/45 |
| 2012/0179433 | A1 * | 7/2012 | Wivell et al. | 703/2 |

OTHER PUBLICATIONS

Crosby, "The Effect of DEM Resolution on the Computation of Hydrologically Significant Topography Attributes" [online] published Mar. 6, 2006, <URL:scholarcommons.usf.edu/cgi/viewcontent.cgi?article=5055&content=etd.pg. 26-27, 29, 41-42.

* cited by examiner

*Primary Examiner* — Atiba O. Fitzpatrick
*Assistant Examiner* — Thomas A James
(74) *Attorney, Agent, or Firm* — Perkins Coie LLP

(57) ABSTRACT

A processor-based apparatus for computing stream vectors for an area of interest divides the area of interest into a number of hydrologic unit code (HUC) areas. The processor calculates stream vectors from lower resolution digital elevation map (DEM) data. For those HUC areas where higher resolution DEM data is available, the processor merges the lower resolution and higher resolution DEM data. Stream vectors are calculated from the merged DEM data and used to replace those stream vectors calculated from the lower resolution DEM data. Attributes of stream vectors that receive upstream flow from an adjacent HUC area are corrected.

8 Claims, 9 Drawing Sheets

METHOD AND APPARATUS FOR DERIVING STREAM NETWORK VECTORS FROM DIGITAL ELEVATION MAP DATA

FIELD OF THE INVENTION

The disclosed technology relates generally to computer systems, and in particular to programmed computer systems for calculating stream vectors from digital elevation maps.

BACKGROUND

Many private and governmental organizations need to determine information regarding water flow over a geographic area of interest. Such information can be used for such purposes as determining setbacks for logging or other forestry operations, for use in determining water rights, habitat restoration, endangered species protection and the like. As an alternative to physically surveying a land area to plot stream/river flows, water flow can be estimated with a computer and a digitized topographical map. The U.S. Geological Service ("USGS") has developed sets of digital elevation maps ("DEMs") that cover the entire United States and can be used to estimate water flow. Most DEMs produced by the USGS have a spatial resolution of approximately 10×10 meters per pixel.

In addition to the USGS DEMS, many land areas have been mapped with higher resolution imaging systems. One such imaging system is a light detection and ranging system ("LiDAR"). With LiDAR, an aircraft is flown over a geographic region while a sweeping pattern of laser pulses are directed towards the ground. A detector detects reflections of the laser pulses. The roundtrip time of each reflected laser pulse is determined and used to assign the pulse a three-dimensional coordinate in order to create a three dimensional map of the underlying terrain. LiDAR DEM data can have a spatial resolution of 2×2 meters per pixel or finer.

While LiDAR or other high resolution DEM data can be used to produce better estimates of stream locations and drainage area sizes, such data is typically only available for small portions of a geographic region of interest. Therefore, there is need for a system that can integrate both lower resolution DEM data that covers a wider geographic area and higher resolution DEM data that provides more detail to determine stream vectors for a desired region of interest.

DETAILED DESCRIPTION

As will be discussed in further detail below, the technology described herein relates to a system and method for calculating stream vectors within an area of interest. In particular, the disclosed technology relates to systems and methods for creating stream vectors by combining higher and lower resolution digital elevation maps. In one embodiment, corrections are made to account for water flowing into and out of the HUC areas.

As will be explained in further detail below, an area of interest is divided into a number of hydrologic unit codes for which digital elevation maps are available. For HUCs where higher resolution DEMs are available, the stream vectors and attributes are created from the higher resolution data or from a combination of the higher and lower resolution DEM data. Stream vectors computed from the higher resolution data are substituted for the stream vectors computed from the lower resolution data. Flow attributes for the stream vectors for the area of interest are then re-computed using both the lower and higher resolution DEM data.

In one embodiment, corrections are made to the combined DEM data for obstructions in stream flow including roads, berms or other impediments to flow and the stream vectors are re-calculated using these corrections to improve the accuracy of stream vector calculations.

Figure 1:
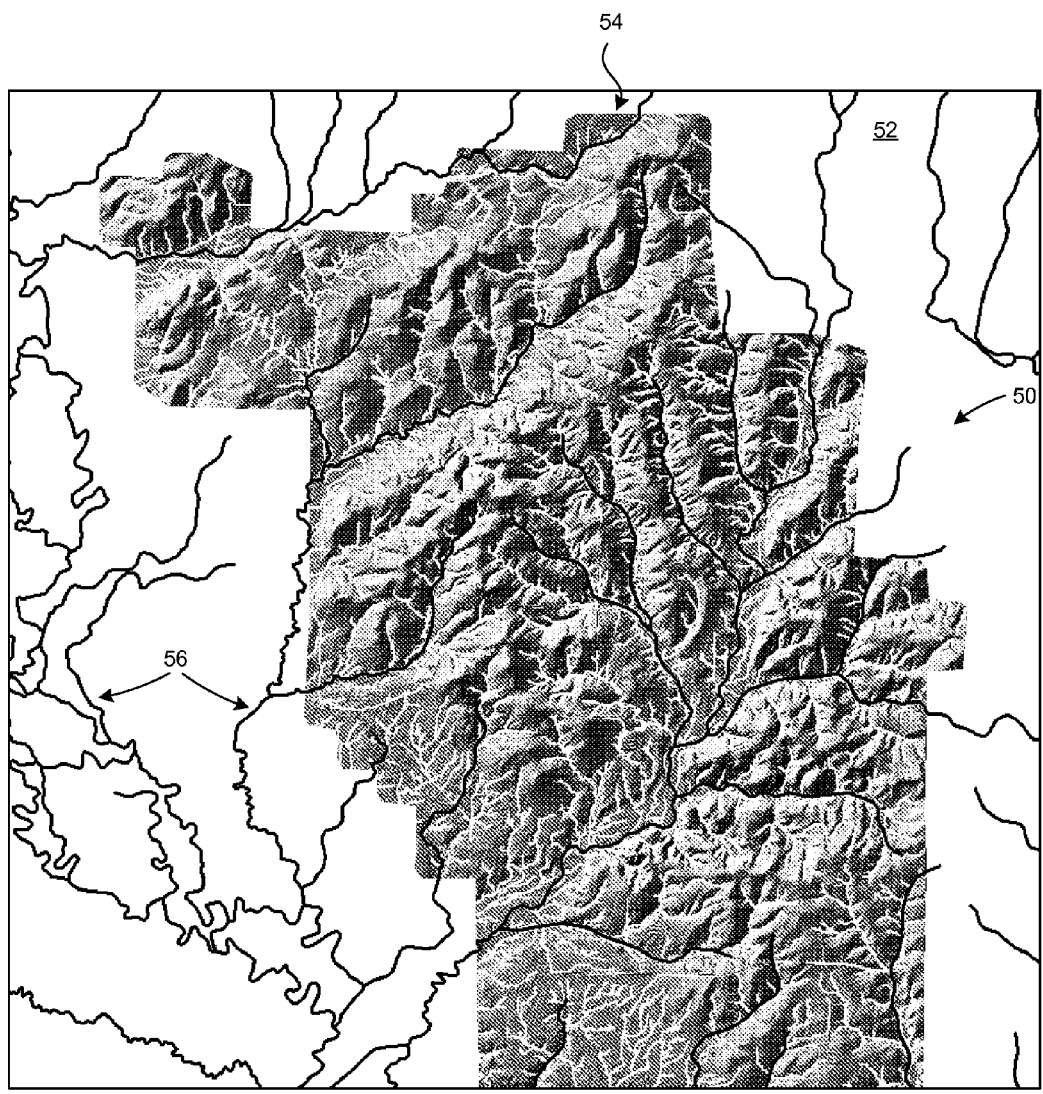
FIG. 1 illustrates stream vectors determined from a lower resolution digital elevation map (DEM) data combined with stream vectors computed from higher resolution LiDAR DEM data.

FIG. 1 illustrates an area of interest 50 for which low resolution DEM data 52 and higher resolution DEM data 54 are available. The lower resolution digital elevation data may include a number of stream vectors 56 for larger streams in the area. The stream vectors 56 are generally obtained from the U.S. Geological Service or other sources. The stream vectors 56 are often hand drawn and may not accurately follow the actual water flow paths within the geographic area. The stream vectors 56 cannot be used to calculate data for the streams such as the drainage basin area. The DEM data 52 has a lower resolution (e.g., 10×10 meters per pixel) but covers the entire USA.

The higher resolution DEM data 54 can be used to increase the accuracy of stream vectors calculated for the region of interest 50 compared to those calculated from a lower resolution digital elevation map. Stream vectors 56 are determined from the lower resolution DEM data in the conventional manner. Using the higher resolution DEM data 54, more accurate stream vectors can be calculated. To provide an accurate model of all the water flow within the area of interest 50, the stream vector data determined from the higher resolution DEM data 54 is combined with the stream vector data determined from the lower resolution DEM data 52.

Figure 2:
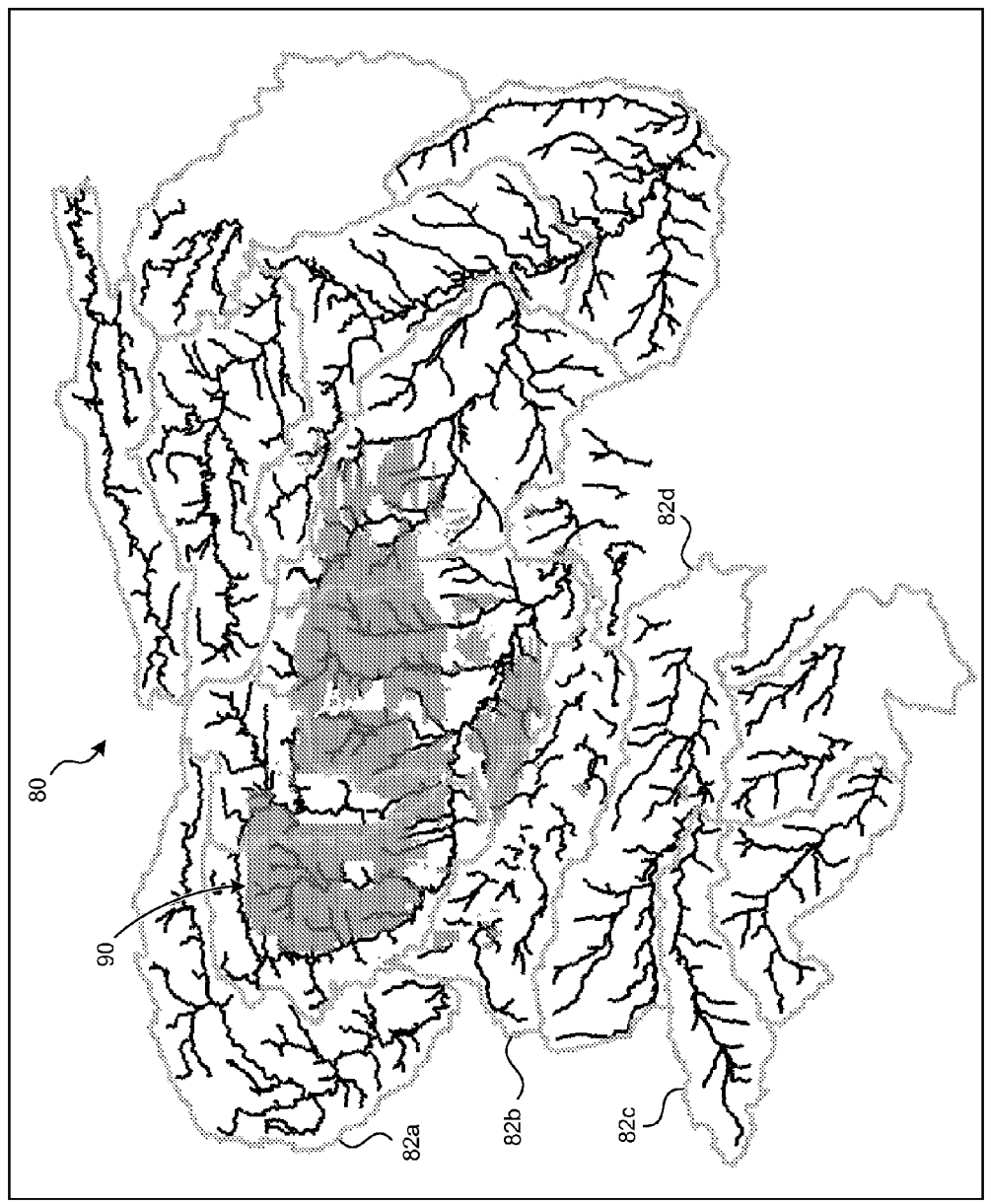
FIG. 2 illustrates how an area of interest is broken up into a number of hydrologic unit code ("HUC") areas.

FIG. 2 illustrates another geographic area of interest (AOI) 80. The AOI 80 can be considered as a collection of hydrologic unit code (HUC) areas. Each HUC defines a drainage basin area within the AOI 80. In a system devised by the U.S. Geological Service, HUCs having smaller numeric designations define larger drainage areas. In the example shown, the AOI 80 is divided into a number of HUC 8 areas 82a, 82b, 82c, etc. For some of these HUC areas, higher resolution DEMs 90 may be available. In one embodiment of the disclosed technology, the lower resolution DEM data is processed for HUC 8 areas while higher resolution LiDAR data is processed for HUC 10 areas. The selection of which size HUC to process is largely dependent upon the processing power and memory available in a computer system used to calculate the stream vectors. In general, the geographic size of each HUC is ten times greater than the next smallest HUC size and ten times smaller than the next greater HUC size. For example, a HUC 10 area is approximately ten times larger than a HUC 12 area and approximately ten times smaller than a HUC 8 area.

Figure 3:
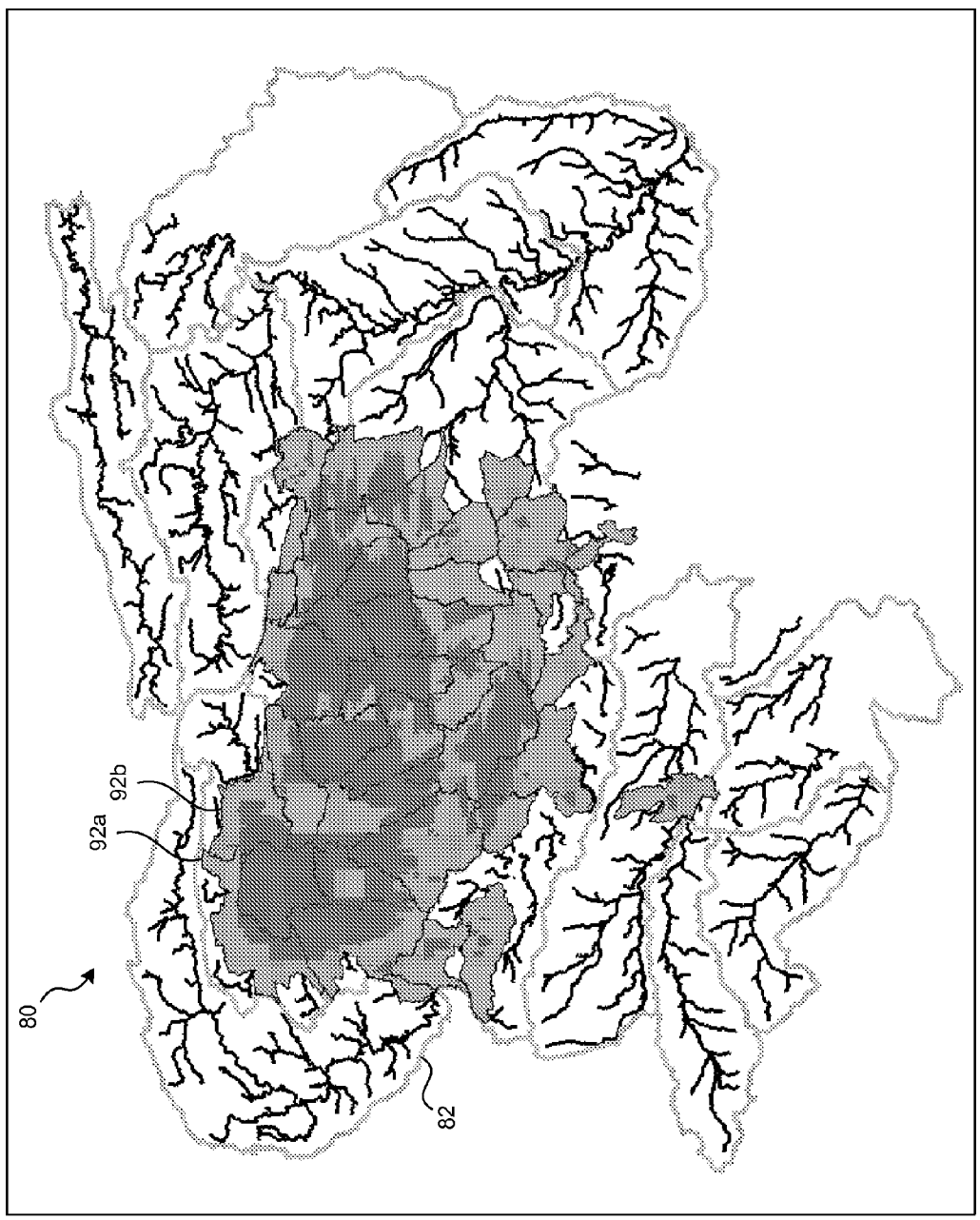
FIG. 3 illustrate a number of larger HUCs having only lower resolution DEM data and a number of smaller HUCs having higher resolution DEM data.

FIG. 3 illustrates a number of smaller HUC 10 areas 92a, 92b, etc. (shown in light grey) included within the collection of HUC 8 areas 82 that define the AOI 80. The HUC 10 areas 92a, 92b, etc. have higher resolution DEM data covering at least a portion of the HUC 10 areas. In some cases, the higher resolution DEM data may cover two or more HUC 10 areas. Stream vectors are calculated from the higher resolution DEM data and then merged with the stream vector data calculated from the lower resolution DEM data in order to produce the stream vectors for the entire AOI 80. In one embodiment, stream vectors calculated from the higher resolution DEM data are substituted for the stream vectors calculated from the lower resolution DEM data.

As will be appreciated by those of ordinary skill in the field of GIS computer programming, an initial set of stream vectors can be determined within the larger geographic areas from the lower resolution DEM data. To calculate an initial set of stream vectors, the lower resolution DEM data, such as 10 meter USGS DEM data, is merged across a number of hydrologic areas such as HUC 8 basins that cover the entire area of interest. In one embodiment, an initial set of stream vectors is then determined with the lower resolution DEM data using the following program steps within a GIS computer program such as ArcGIS available from ESRI of Redlands, Calif.

fill pits (grid);
calculate Flow and Direction (grid);
calculate Flow Accumulation (grid);
threshold accumulation for a stream initiation (grid, conditional command) (use a chosen drainage area for stream initiation);
convert maximum Flow Accumulations to stream vectors (Vector, Streamline Command);
calculate Stream Order (Vector); and
calculate basin area (grid attribute to Vectors series of commands).

Once the stream vector calculations are made from the lower resolution DEM data, they are stored in a database or other computer readable file format to be combined with stream vectors determined from the higher resolution DEM as will be explained in further detail below.

For those areas where higher resolution DEM data is available, stream vectors are then calculated using the higher resolution DEM data and/or the combination of the higher resolution/low resolution DEM data. Some adjustments may be necessary if the higher resolution DEM data does not cover an entire HUC area. If an area is not completely surveyed with the higher resolution mapping system then the high resolution data and the lower resolution data are combined for the HUC. In one embodiment, the lower resolution data are re-sampled at a higher spatial rate with a bi-linear or other re-sampling technique before being combined with the higher resolution DEM data.

In another example, many lower resolution and higher resolution DEMs may show different elevations for the same geographic location. If the higher resolution DEM data is inserted into a lower resolution DEM or vice versa, the differences in elevation data may define a lip or ledge over which water flow will not be calculated. Therefore, it may be necessary to identify the location of these differences in elevation and "burn in" a channel in the combined DEM data so water can flow across the low/higher resolution DEM data boundary. These channels are generally hard-coded into the combined low resolution/high resolution DEM data prior to beginning the stream vector calculations.

Because the higher resolution DEM data may detect roads, berms or other obstructions to water flow, the stream vector data may define a number of "digital lakes" within the drainage basins because the computer program does not calculate water flow across the road or berm. Therefore, it is often necessary to hard-code a culvert or other water flow path that passes through the obstruction in the DEM data to reflect the true water flow path in the area. For example, culverts can be made by defining a one pixel wide trough of sufficient depth to ensure water flow through the area. The depths of these troughs can be any depth to ensure water flow (e.g., 50 feet deep). The troughs are typically filled with the fill command discussed above, to a level sufficient to calculate fluid flow across the HUC prior to re-calculating the stream vectors.

Once any blockages to water flow are corrected in the DEM, the stream vectors are re-calculated in an iterative process until any changes calculated between iterations is minimal. Once the stream vectors are calculated, stream attributes such as basin areas and stream order number can be calculated for each stream vector.

In one embodiment, basin areas are calculated by converting a top node of each stream vector to a point. The point is then snapped to the largest accumulation within a two pixel distance. The points are then converted to raster. Zonal statistics from the raster points to the accumulation grid are determined and an ArcGIS "relate" command is then used to move the maximum accumulation value (i.e. converted to acres) back to the vector.

Figure 4:
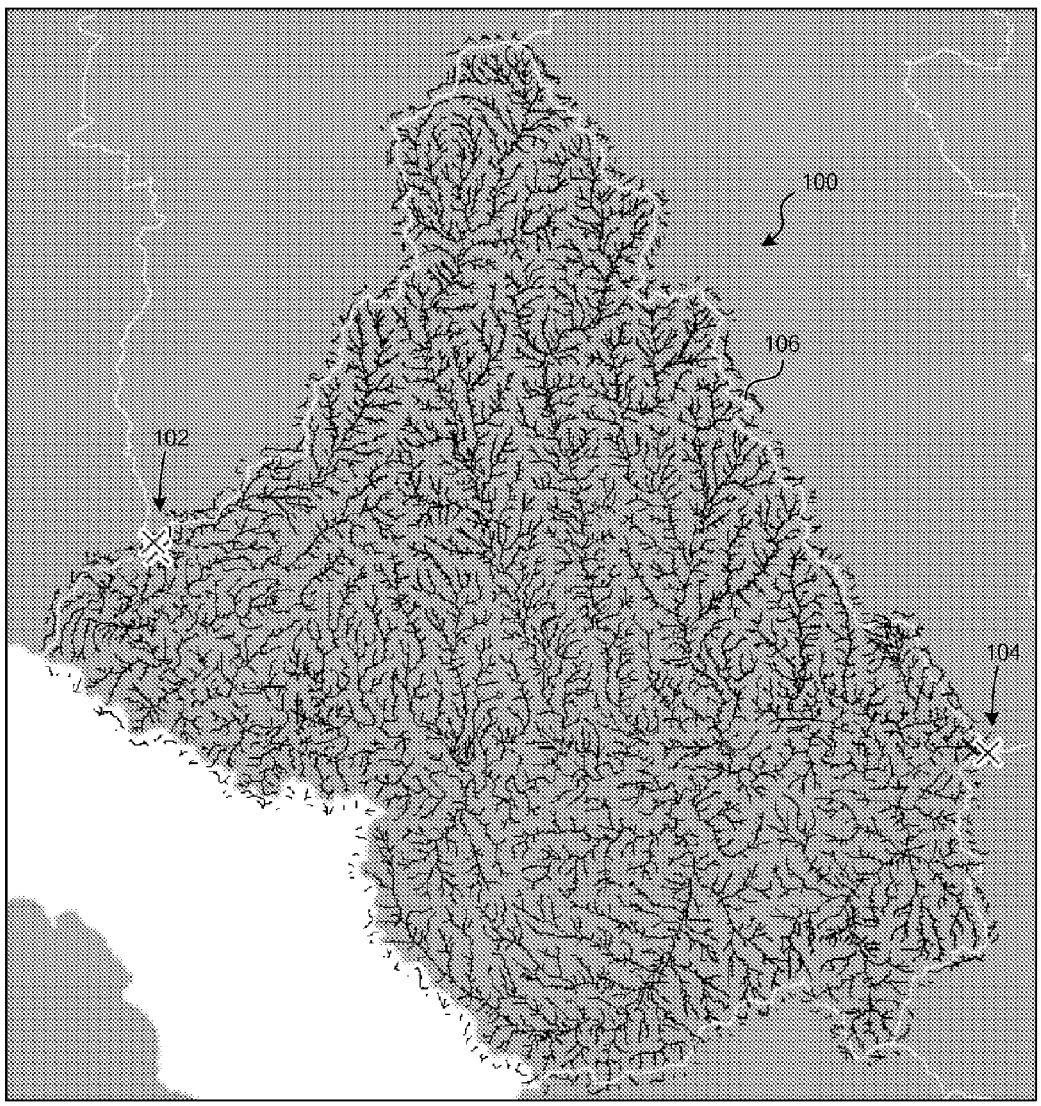
FIG. 4 illustrates how stream vectors calculated from higher resolution DEM data may extend beyond the borders of a HUC.

The stream vectors calculated from the merged DEM data defines a basin area that differs from the geographically defined HUCs from the USGS. FIG. 4 illustrates an example where an HUC area 100 has stream vectors calculated in it that may extend beyond the boundaries 106 of the actual drainage basin area for the HUC. To calculate the actual basin boundary, points of inflow and outflow to the HUC area are marked as "pour points" 102, 104. A hydrologic basin boundary is then calculated based on the pour points using the flow direction and accumulations calculated from the merged DEM. Stream vectors outside the calculated boundary of the drainage basin 106 can be eliminated.

Figure 5:
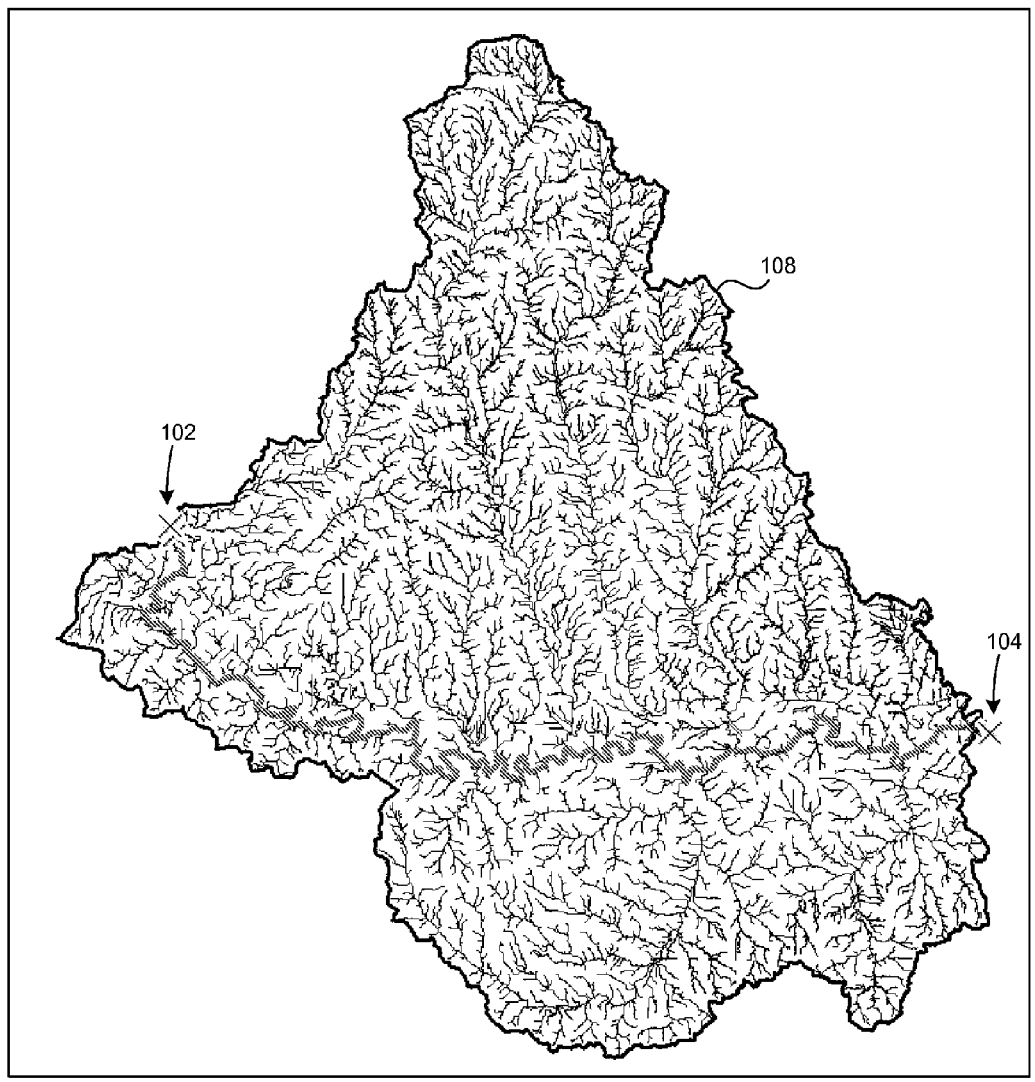
FIG. 5 illustrates how the borders of a HUC can be redefined from the calculated stream vectors.

FIG. 5 illustrates a refined boundary 108 that defines the boundaries of a drainage basin for the HUC as determined from the downstream and upstream analysis of the pour points 102, 104.

Figure 6:
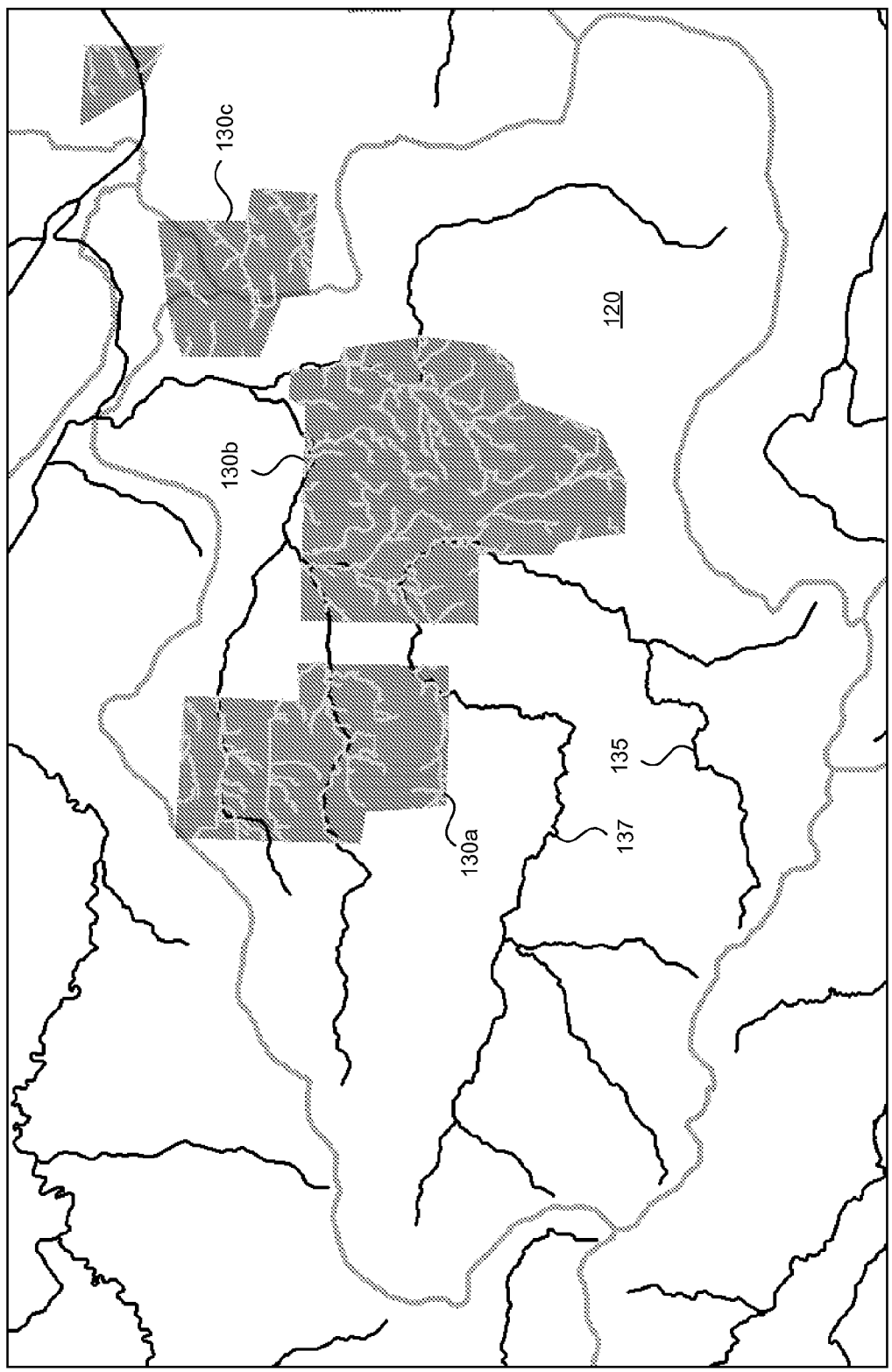
FIG. 6 illustrates stream vectors calculated from higher resolution DEM data combined with rough approximations of stream vectors obtained from USGS DEM data.
Figure 7:
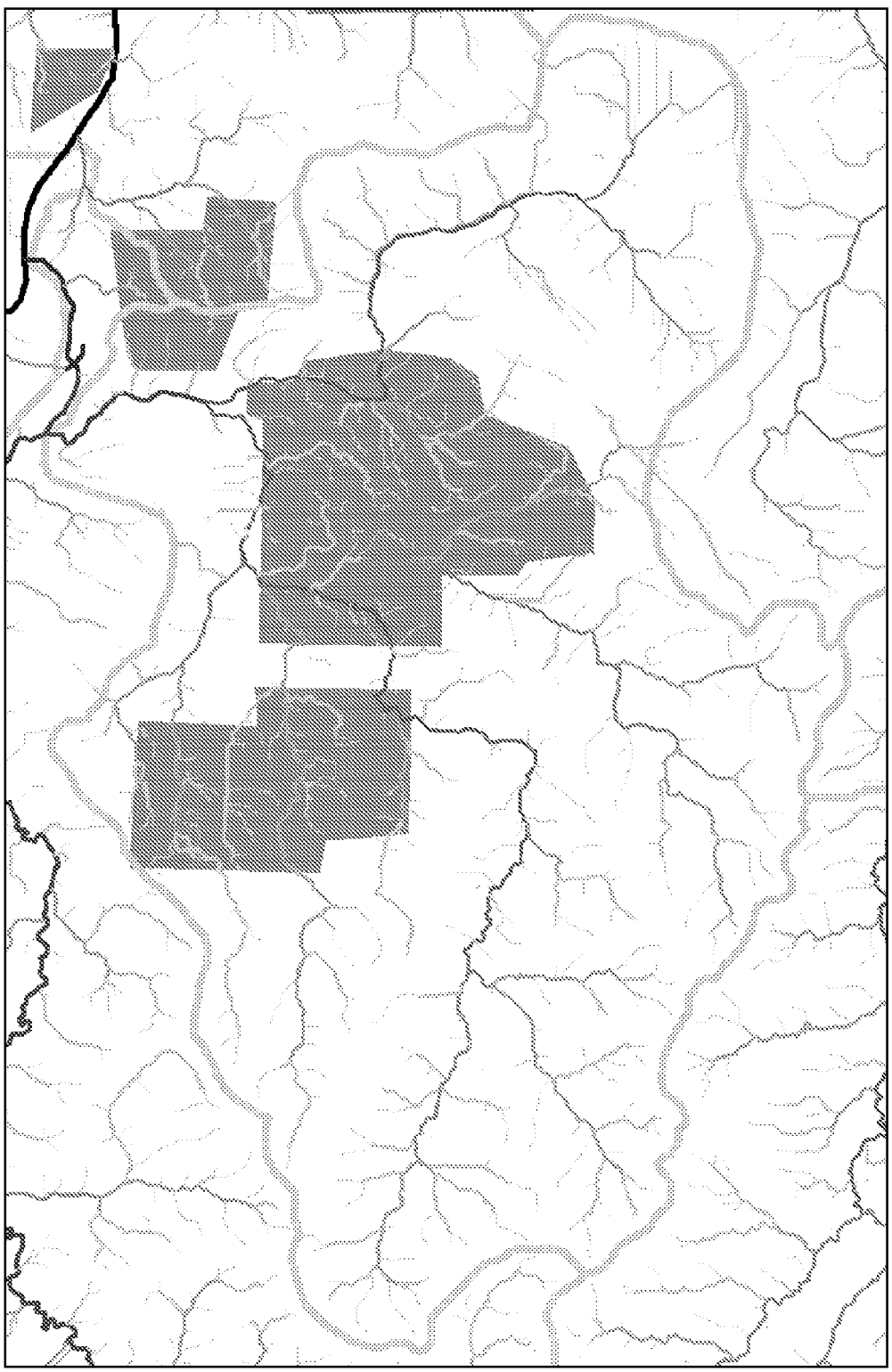
FIG. 7 illustrates stream vectors calculated from combined higher and lower resolution DEM data in accordance with the disclosed technology.

FIG. 6 illustrates an example of how a HUC area 120 may include lower resolution DEM data and regions 130a, 130b, 130c etc. having higher resolution DEM data. The lower resolution data may include rough approximations of stream vectors 135, 137 as determined by the USGS. As indicated above, for those HUC areas where higher resolution DEM data is available, a merged DEM is created by re-sampling the lower resolution data to the resolution of the higher resolution data and the stream vectors for the HUC are calculated. The stream vectors calculated from the lower resolution data are then replaced with those calculated from the merged DEM data. Pour points marking the location of where flow enters the HUC area are used to align the stream vectors calculated from the merged data with those calculated from the lower resolution DEM data. FIG. 7 shows a single HUC area having stream vectors calculated from merged DEM data.

Figure 8:
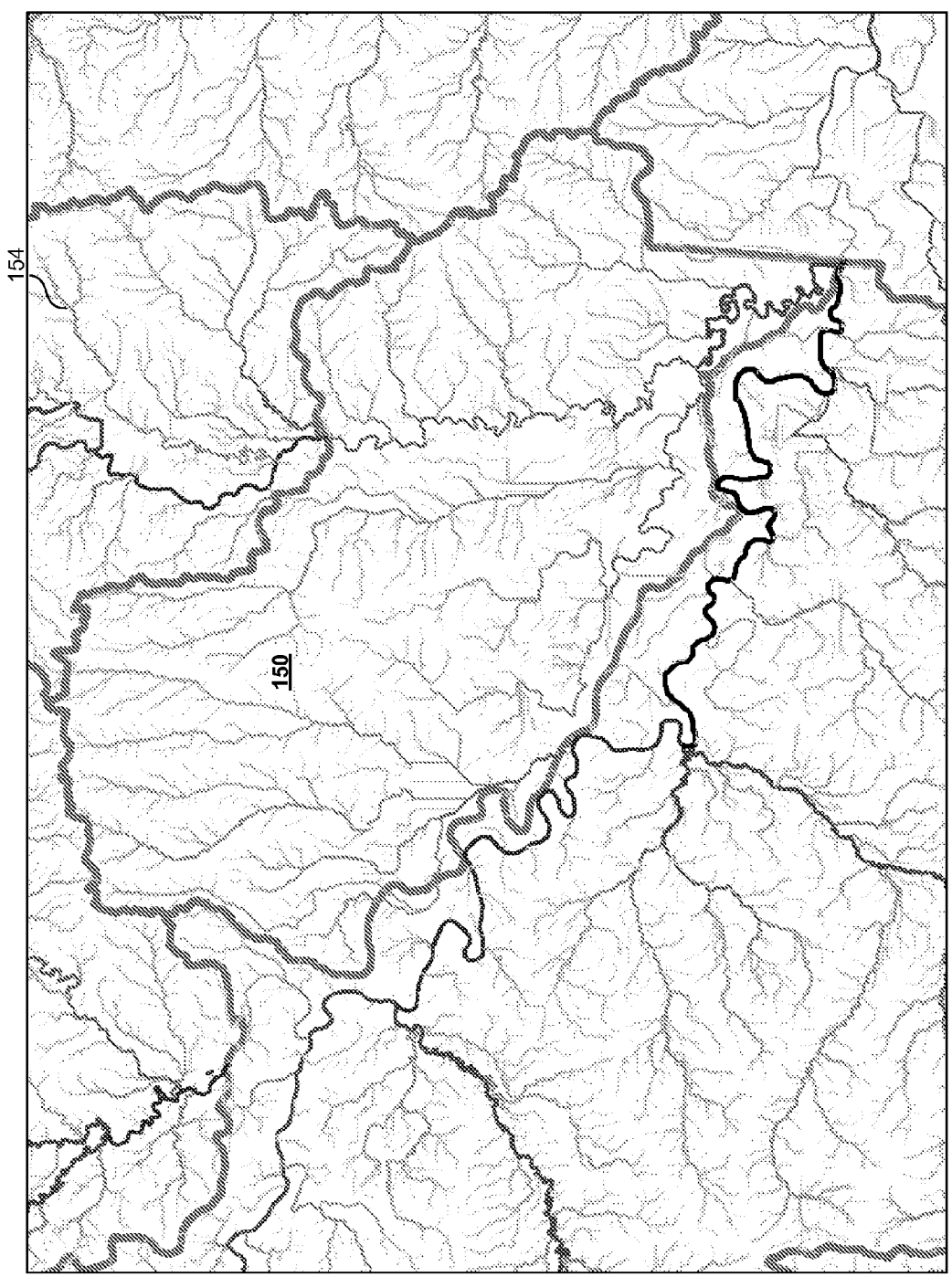
FIG. 8 illustrates how stream vector attributes calculated for a HUC area may be inaccurate if stream flows into and out of the HUC are not taken into consideration.

In instances where streams flow into a HUC 10 basin, the locations of the stream vectors calculated from the merged DEM data are correctly determined, but the attributes, namely the stream order number and drainage basin size for each stream vector (Flow Attributes), may not be correctly determined by only analyzing a single HUC area without considering surrounding HUC areas that drain water into the HUC area in question. FIG. 8 shows an example of a smaller HUC area 150 having stream vectors calculated therein. In the example shown, the HUC area 150 has one or more stream vectors calculated therein that also receive water flow from an adjacent HUC area 154. Because the adjacent HUC area 154 was not considered when the stream vectors for the HUC area 150 were initially calculated, pour points are placed at the location(s) where water enters the HUC area 150 and exits the HUC area 150. The pour points previously created are used to identify all the stream vectors downstream of these pour points. These stream vectors are the only ones with incorrect flow attributes that will need to be corrected. In one embodiment, the correct stream vector attributes are calculated by burning the correct location of the stream vectors (determined with the merged DEM data) back into the low resolution DEM data. The stream vectors for the entire set of combined HUC areas are re-calculated using the modified low resolution DEM data, and those stream vector attributes that were incorrectly determined from the high resolution DEM data are replaced with the now correctly determined attributes. The result is an accurate determination of stream order number and basin area for each stream vector.

This process can continue by considering the points at which water enters larger HUC areas. Pour points are defined at locations where water enters these larger HUC areas from adjacent HUC areas. The data for the stream vectors in the HUC area in question are then re-calculated by taking into consideration the water than enters a basin drainage area. This has the effect of greatly increasing the accuracy of the drainage basin size that is calculated for each individual stream vector.

Figure 9:
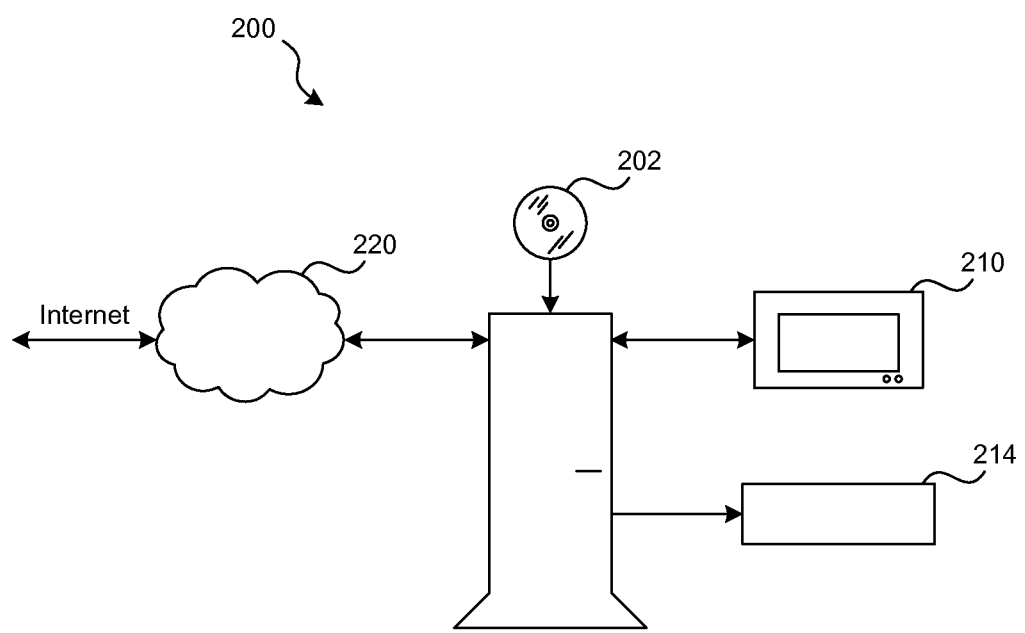
FIG. 9 illustrates a representative computer system with which the disclosed technology may be implemented.

FIG. 9 illustrates a representative computer system with which the disclosed technology can be implemented. The computer system 200 includes programmable processor electronics that are configured to execute program instructions in order to produce stream vector data in the manner described above. The computer system can be implemented as a desktop computer, laptop computer, tablet computer or other data processing device with sufficient programming power to compute the stream vectors. Alternatively, the computing system can be a client-type computing device that communicates with a remote computer that has sufficient computing power to calculate the stream vectors. In this case, the computer system 200 can be a less powerful system including a mobile computing device such as a smart phone, PDAs, gaming console and the like.

The computer system may communicate via a wired or wireless (e.g. WiFi, WiMAX, Bluetooth etc.) computer communication link 220 to other computer networks such as the Internet.

The instructions executed by the processor electronics may be received via the Internet or stored on a non-transitory computer readable media 202 such as a CD-ROM, hard disk, flashdrive or other computer readable memory. Stream vector data is stored in a database 204 or in another file format in order to produce reports that may be displayed on a visual monitor 210, printed from a printer 214 or transmitted to a remote location via the computer communication link 220.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor electronics" encompasses all kinds of apparatus, devices, and machines for processing data, including by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A processor-based system for calculating stream vectors in an area of interest, comprising:
a memory for storing program instructions;
processor electronics configured to execute the program instructions in order to:
receive digital elevation map (DEM) data for a number of hydrologic unit code (HUC) areas having lower resolution digital elevation map (DEM) data and for which at least one HUC area has both lower resolution and higher resolution DEM data available;
compute a number of stream vectors for the HUC areas that define the area of interest from the lower resolution DEM data;
where higher resolution DEM data in a HUC are available:
merge the lower and higher resolution DEM data for the HUC;
compute a number of stream vectors from the merged DEM data;
replace the stream vectors for the HUC area that were computed from the lower resolution DEM data with the stream vectors computed from the merged DEM data;
mark pour points where flow enters the HUC area from one or more surrounding HUC areas outside of the HUC area that is covered by the merged DEM data;
correct attributes of the stream vectors computed from the merged DEM data that are downstream of the pour points by
modifying the lower resolution DEM data to include corrected locations of the stream vectors computed from the merged DEM data;
recalculating stream vectors and their attributes for the HUC area and those surrounding HUC areas that supply inflow to the HUC area using the modified lower resolution DEM data; and
replacing attributes that were incorrectly determined from the merged DEM data with the attributes determined from the modified lower resolution DEM data.

2. The processor-based system of claim 1, wherein the instructions are executable by the processor electronics to merge the lower and higher resolution DEM data by:
re-sampling the lower resolution DEM data to have a resolution equivalent to that of the higher resolution DEM data;
determining if a boundary of the lower and higher resolution DEM data prevents flow from being computed across the boundary and if so,
defining a path for fluid flow across the boundary in the DEM data.

3. The processor-based system of claim 1, wherein the instructions are executable by the processor electronics to:
- compute a first set of stream vectors from the merged DEM data;
- analyze the stream vectors to determine if the stream vector flows are diverted by obstructions in the merged DEM data; and
- encode one or more paths for fluid flow across flow obstructions in the merged DEM data; and
- re-compute the stream vectors with the merged DEM data and the one or more encoded fluid flow paths.

4. The processor-based system of claim 1, where the attributes include basin area.

5. The processor-based system of claim 1, where the attributes include stream order.

6. A non-transitory computer readable media having a number of instructions stored thereon are executable by a processor to calculate stream vectors for an area of interest by:
- receiving digital elevation map (DEM) data for a number of hydrologic unit code (HUC) areas having lower resolution digital elevation map (DEM) data and for which at least one HUC area has both lower resolution and higher resolution DEM data available;
- computing a number of stream vectors for the HUC areas that define the area of interest from the lower resolution DEM data;
- where higher resolution DEM data in a HUC are available:
  - merging the lower and higher resolution DEM data for the HUC;
  - computing a number of stream vectors from the merged DEM data;
  - replacing the stream vectors for the HUC area that were computed from the lower resolution DEM data with the stream vectors computed from the merged DEM data;
  - marking pour points where flow enters the HUC area from one or more surrounding HUC areas outside of the HUC area that is covered by the merged DEM data;
  - correcting attributes of stream vectors computed from the merged DEM data that are downstream of the pour points by
    - modifying the lower resolution DEM data to include corrected locations of the stream vectors computed from the merged DEM data
    - recalculating stream vectors and their attributes for the HUC area and those surrounding HUC areas that supply inflow to the HUC area using the modified lower resolution DEM data; and
    - replacing attributes that were incorrectly determined from the merged DEM data with the attributes determined from the modified lower resolution DEM data.

7. The non-transitory computer readable media of claim 6 further comprising instructions to merge the lower and higher resolution DEM data by:
- re-sampling the lower resolution DEM data to have a resolution equivalent to that of the higher resolution DEM data;
- determining if a boundary of the lower and higher resolution DEM data prevents flow from being computed across the boundary and if so,
- defining a path for fluid flow across the boundary in the DEM data.

8. The non-transitory computer readable media of claim 6, further comprising instructions that are executable by a processor to:
- compute a first set of stream vectors from the merged DEM data;
- analyze the stream vectors to determine if the stream vector flows are diverted by obstructions in the merged DEM data; and
- encode one or more paths for fluid flow across flow obstructions in the merged DEM data; and
- re-compute the stream vectors with the merged DEM data and the one or more encoded fluid flow paths.

* * * * *